Figure 1:
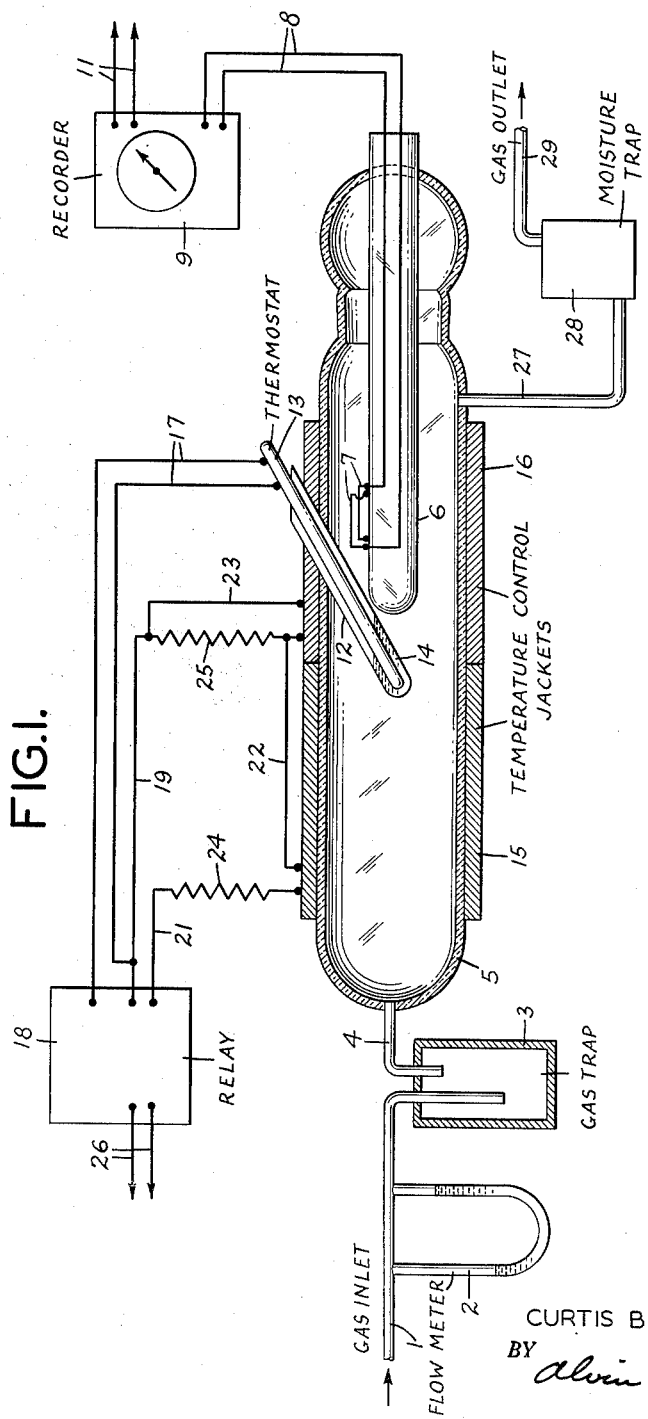

April 22, 1952 C. B. HAYWORTH 2,594,163
DETERMINATION OF MOISTURE IN GASES
Filed Jan. 22, 1949 2 SHEETS—SHEET 1

INVENTOR.
CURTIS B. HAYWORTH
BY
ATTORNEY.

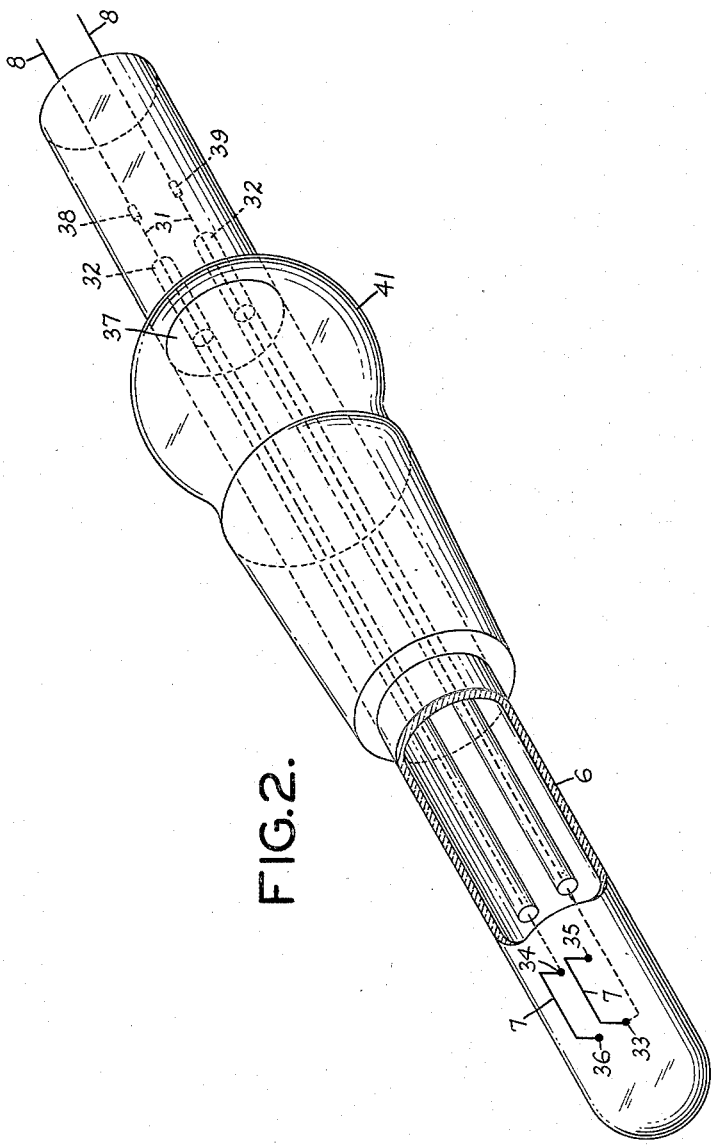

Patented Apr. 22, 1952

2,594,163

UNITED STATES PATENT OFFICE 2,594,163

DETERMINATION OF MOISTURE IN GASES

Curtis B. Hayworth, New York, N. Y., assignor to Allied Chemical & Dye Corporation, New York, N. Y., a corporation of New York Application January 22, 1949, Serial No. 72,130

4 Claims. (Cl. 73—29)

This invention relates to a method and apparatus for determining moisture in gases and more particularly refers to continuous recording of moisture in gases by measuring the electrical conductivity of a hydroscopic material in contact with gases containing moisture.

The present invention is especially suitable for determining and recording moisture in sulfuric acid contact process gases which have low moisture concentrations and contain sulfur dioxide. Heretofore, the determination of contact process gases has been carried out by a laborious time-consuming gravimetric method which gave a measurement of moisture content of gases merely at the time the sample of gas to be tested was withdrawn, i. e. spot information concerning the actual moisture conditions, but failed to tell how the process was functioning between gravimetric tests.

A primary object of the present invention is to provide an improved method and apparatus for obtaining accurate measurements of the moisture content of gases in a more rapid and efficient manner than has hitherto been attained.

Another object of the invention is to provide a method and means of determining electrical conductivity of a hygroscopic material in contact with gases containing moisture as an index of the moisture content in the gases.

A further object of the invention is to provide a continuous method of measuring changes in moisture content in gases of varying composition.

Another object of the invention is to provide a method and means for determining moisture content of gases containing corrosive substances such as sulfur dioxide.

A further object of the invention is to provide a method and apparatus for measuring moisture in gases having a low concentration of water.

Another object of the invention is to provide a device for continuously measuring moisture in gases which is simple and economical in construction and which will operate for long periods of time without undue attention.

Other objects and advantages of the invention will be apparent from the following description and accompanying drawings.

A preferred method of practicing the process in accordance with the present invention comprises passing a gas containing moisture in contact with a film of hygroscopic material suspended between two electrodes, maintaining the gas during its contact with the film of hygroscopic material at a constant temperature and electrically determining the conductivity of the film of hygroscopic material.

A preferred form of apparatus for carrying out the present invention comprises a housing having a gas inlet and gas outlet, a heating jacket surrounding the housing for thermostatically maintaining a constant temperature therein, a conductivity cell contained in the housing supporting two narrowly spaced electrodes, a film of hygroscopic material suspended between the electrodes which film is exposed to the moisture containing gases passing through the housing thereby varying the moisture content of the hygroscopic material with changes in moisture content of the gases passing therethrough, and electrical measuring means for determining the conductivity of the film of hygroscopic material.

Referring to the drawings, Figure 1 diagrammatically represents the complete unit assembly of the moisture recording apparatus. Figure 2 is an isometric view of the conductivity cell in partial section.

The various parts making up the assembly of the recording apparatus of Figure 1 are gas inlet 1 into which gas containing moisture enters, flow meter 2 which measures the flow of gas through the apparatus, gas trap 3 which prevents the passage of liquid into the recording apparatus, inlet 4 which conducts the gas to housing 5, conductivity cell 6 having mounted thereon electrodes 7, leads 8 connected to recorder 9 which in turn through leads 11 are connected to 110 volts 60 cycle alternating current, thermostat well 12 into which is inserted thermostat 13 extending into housing 5, mercury 14 filling the bottom portion of thermostat well 12, temperature control jackets 15 and 16 surrounding housing 5, leads 17 leading from thermostat 13 to relay 18 which connects to temperature control jackets 15 and 16 by means of leads 19, 21, 22, 23 and resistance elements 24 and 25, leads 26 connected to 110 volts 60 cycle alternating current for supplying heat to temperature control jackets 15 and 16 and for activating relay 18, gas exhaust conduit 27, moisture trap 28 and gas outlet 29.

The conductivity cell 6 (Figure 2) consists of "Pyrex" glass tubing open at one end about 12 mm. in diameter and about 200 mm. long. Two platinum wires 31 about 24 gauge thickness covered by glass shields 32 extend inside tube 6 along its length passing through the glass wall of tube 6 at points 33 and 34 with the terminal points sealed to the top of the glass surface at points 35 and 36 in such manner to form a pair of parallel rectangular planes extending about 5 mm. in height above the surface of tube 6. Electrodes 7 between which a drop of hygroscopic material is suspended are approximately 15 mm. long and spaced by a distance of 0.5 to 1 mm. Passages 33 and 34 through which platinum wires 31 pass through the wall of tube 6 are sealed to prevent the leakage of any gas or moisture into tube 6. Likewise near the open end of tube 6 a glass plate 37 is welded to shields 32 and the inner wall of tube 6 to seal that end of the tube from the atmosphere. Also the ends of shields 32 extending beyond plate 37 are sealed to platinum wires 31 to prevent any leakage through openings in shields 32. The ends of platinum wires 31 are welded at points 38 and 39 to insulated stranded copper wires 8 which lead to recorder 9. A ground glass stopper 41 adapted to fit into housing 5 (Figure 1) surrounds tube 6 and is welded thereto.

Installation of conductivity cell 6 and housing 5 is as follows: The position of platinum wire electrodes 7 is adjusted so that they are straight, parallel and about 0.5 to 1.0 mm. apart. This can best be done by inserting a razor blade between them pressing the wires against it with a pair of ivory tipped forceps and then cautiously removing the blade. Care must be exercised to avoid chipping glass from seals 33 and 34 which might result in cutting or weakening of the platinum wire. Clean the electrodes in warm chromic acid, rinse with distilled water and dry with acetone. Insert the conductivity cell 6 into housing 5 temporarily for protection. Fasten heating jacket 15 and 16, the latter provided with an opening through which well 12 extends, around housing 5 in such manner that gas entering inlet 4 is preheated to the desired temperature by jacket 15 and maintained at that temperature during its contact with the hygroscopic material by jacket 16.

The assembly is now ready for installation in the plant where it is required for testing the moisture content of gases. The assembly must be mounted rigidly so that it cannot be moved or rotated, either of which might break the hygroscopic film, and should be protected by housing in a cabinet with provision for removing the conductivity cell 6 for inspection or reloading without disturbing the rest of the apparatus. The thermostat well 12 should be in an upright position as shown in Figure 1.

The electrolyte may be prepared, for example, by spreading about 0.2 gram of phosphorus pentoxide on a watch glass and allowing it to absorb just enough moisture to liquefy. If it is permitted to hydrate completely an excessive period of time will be required for the cell to reach equilibrium when first put into operation. The cell is then removed from its housing and by means of an eyedropper or glass rod a single drop of the liquid phosphorus pentoxide on the watch glass is transferred to electrodes 7 so that a film is formed in the space between them. Thereafter immediately reinsert cell 6 in housing 5 with electrodes 7 facing upwards towards thermostat well 12 as shown in Figure 1.

About 2 cc. of mercury are poured into thermostat well 12 and then thermostat 13 inserted into the well. Thermostat leads 17 are connected to conventional relay 18 which in turn are connected in circuit with heating jackets 15 and 16 through leads 19, 21, 22 and 23 and resistance elements 24 and 25, 100 and 200 watt lamps, respectively, have been found satisfactory for this purpose. While I have described one common expedient of thermostatically regulating the temperature in housing 5 any well known method, of which there are many, may be adopted for obtaining constant temperature of the gas flowing through housing 5.

Copper lead wires 8 are connected to recorder 9 which may be an ordinary Wheatstone bridge having the usual pairs of resistance arms, one arm consisting of the electrolyte suspended between electrodes 7, and a galvanometer for measuring the degree of unbalance in the bridge circuit and thereby changes in resistance of the film of electrolyte. The Wheatstone bridge and its operation in connection with measuring changes in resistance are well known to those skilled in the art. Various refinements have been added to the Wheatstone bridge making possible instantaneous recordings of changes in the resistance of a variable resistance element. Such instruments are commonly designated in industry as "Micromax" recorders. Any suitable means for recording the resistance of the hygroscopic material between electrodes 7 may be employed in the practice of my invention.

A sample line may be connected from a plant containing gas whose moisture content is to be determined to gas inlet 1 at a point in the plant where there is positive pressure; thereby slow leaks in the system become relatively unimportant and no pumping equipment is necessary. Flow meter 2 may be of the usual U-shaped tube containing a liquid and should be calibrated by means of a wet test meter. In the particular apparatus being described with glass cell housing 5 having dimensions of about 50 mm. in diameter and 600 mm. long, a flow of nine to eleven cubic feet of gas per hour will be found to give good results. Gas trap 11, a 250 ml. tall form gas washing bottle, may be interposed between flow meter and gas inlet 4 to catch any liquid that might blow over should the flow meter orifice become clogged.

The moisture trap 28 may then be filled with hygroscopic material, for example calcium chloride, to prevent any moisture from the atmosphere entering housing 5.

Calibration and operation of the cell are as follows: Gas containing moisture content is introduced into the apparatus through gas inlet 1 at a rate of about 10 cubic feet per hour as indicated by flow meter 2. Recorder 9 is then placed in operation.

Depending on the size of the phosphoric acid drop and its degree of hydration, the cell will require from 2 to 4 hours to reach equilibrium with the moisture in the gas. When this has been attained as shown by a fairly constant reading of the recorder without any further drift towards the end of the scale, the cell is calibrated as follows:

Disconnect moisture trap 28 from gas outlet 27 of cell housing 5 and attach in its place a tared $P_2O_5$ absorption bulb, the outlet of which is connected to a dry gas meter. Pass about 5 cubic feet of gas through the system so that sufficient moisture will be absorbed by the $P_2O_5$ absorption bulb to give an appreciable increase in weight. Disconnect the $P_2O_5$ bulb and immediately connect moisture trap 28 to prevent atmospheric moisture from entering cell housing 5. From readings of barometric pressure, temperature of the gas, weight of moisture absorbed by the $P_2O_5$ bulb and volume of gas passing therethrough, the moisture content of the gas may be readily calculated. This procedure in substance is the conventional gravitmetrical determination of moisture in gases.

Set recorder 9 to read the moisture content of the gas just found gravimetrically. The recorder will then be in calibration over the entire range of moisture content for that conductivity cell. It is advisable however to run a duplicate gravimetrical determination to make sure that proper adjustment of the recorder has been made. It is then necessary only to run a single gravimetric determination weekly on the cell as a performance check.

There is a time lag between a change in a moisture content of the gas flowing through housing 5 and its indication by recorder 9. Most of this time is required by the phosphoric acid film between electrodes 7 reaching equilibrium with the gas. Thus, the lag is dependent upon phosphoric acid in the film and the magnitude of the changes occurring in the moisture content of the gas. The latter is usually small enough to make time lag relatively unimportant.

The apparatus heretofore described may be employed for the continuous recording of moisture in not only contact burner gas but also other gases containing moisture, as for example air, nitrogen, oxygen, hydrogen sulfide, methyl chloride and hydrogen chloride. This apparatus will record moistures of from 0.001 to 0.02 gram of water per cubic foot of gas with an accuracy of ±0.001 gram of water per cubic foot. Readings are reproducible.

I have found that if the phosphoric acid film and the gases surrounding it are maintained at a temperature above 50° C. that measurement of moisture in gases containing an excess of 0.03 gram of water per cubic foot of gas can be accurately made but that the film of phosphoric acid is insensitive to gases containing less than 0.03 gram of water per cubic foot of gas. Furthermore, I have found that while I can obtain accurate recordations of moisture in gases containing less than 0.03 gram water per cubic foot of gas at temperatures below 30° C., the time lag in reaching equilibrium between the film of phosphoric acid and the surrounding gas in unduly long and the results therefore not entirely satisfactory. Therefore, in determining the moisture content of gases containing low concentrations of moisture it is desirable to maintain the temperature of the film of phosphoric acid and surrounding gas between 30° C. and 50° C., preferably about 40° C.

Other hygroscopic materials which may be utilized in my method and apparatus for determining moisture content in gases are lithium chloride, calcium chloride, zinc chloride and concentrated sulfuric acid. My preferred electrolyte is phosphoric acid since it is not only sensitive to low concentrations of moisture in gases but also relatively inert to corrosive substances such as sulfur dioxide contained in the contact gas, i. e. no material change in resistance of the phosphoric acid film results due to corrosive components in gas.

The electrodes are preferably made from platinum since this metal is not affected by most corrosive substances and has substantially the same coefficient of thermal expansion as the glass tube through which it passes. Of course, other suitable non-corrosive metal electrodes, for example gold, may be employed when determining the moisture content of corrosive gases. Obviously, electrodes which are subject to corrosion should be used only when the gases to be tested contain no corrosive substances, and also should not be subject to corrosion by the electrolyte used.

A hygroscopic film supported on a nonconducting solid between two metal electrodes when used for determining moisture content of gases has a tendency to drift after a short period of operation, that is, the film of electrolyte records inaccurate values of moisture content in the gas apparently due to the nonconducting solid support thereby requiring frequent recharging of the hygroscopic material and repeated calibrations. I have discovered that a film of hygroscopic material suspended between two electrodes in the absence of a support will retain its accuracy for measuring moisture in gases for long periods of time without recharging, requiring only infrequent performance checks.

My apparatus as illustrated in the drawings and previously described was employed for the determination and control of moisture in sulfuric acid process gases. A stream of the gases at the rate of 10 cubic feet per hour and maintained at 40° C. was passed in contact with a drop of phosphoric acid in the absence of a solid support, suspended between two platinum electrodes during a period of 5½ months and the electrical conductivity of the phosphoric acid as an index of the moisture content in the gases was recorded at intervals of less than ten minutes. Checks against gravimetric moisture determinations over the 5½ months' period of operation of the apparatus showed the maximum deviation to be only 0.002 gram water per cubic foot of gas. Recharging with phosphoric acid and recalibration were found unnecessary during this test period.

Although certain preferred embodiments of the invention have been disclosed for purposes of illustration it will be evident that various changes and modifications may be made therein without departing from the scope and spirit of the invention.

I claim:

1. Apparatus for determining moisture in gases which comprises a glass housing having a gas inlet and a gas outlet, a heating jacket surrounding the housing near its inlet end adapted to elevate gases entering the housing to a desired temperature, a second heating jacket surrounding the housing for thermostatically maintaining a constant temperature therein, a removable hollow glass tube of smaller diameter than the housing extending into the housing, two spaced platinum wires passing through the interior of the tube out through sealed joints onto the surface of the tube to form a pair of exposed platinum electrodes thereon separated by a distance of between about 0.5 and 1.0 mm., an unsupported film of phosphoric acid suspended between the platinum electrodes which film is exposed to moisture containing gases passing through the housing thereby varying the moisture content of the phosphoric acid with changes in moisture content of the gases passing therethrough, and electrical measuring means connected to the platinum wires in the tube for determining the electrical conductivity of the film of phosphoric acid as an index of the moisture content in the gas.

2. Apparatus for determining moisture in gases which comprises a housing having a gas inlet and a gas outlet, two narrowly spaced electrodes contained in said housing, a liquid drop of a hygroscopic non-organic electrolyte in solution suspended between the electrodes and having no other support, which liquid drop of electrolyte in solution is exposed to moisture containing gases passing through the housing thereby varying the moisture content of the liquid drop of hygroscopic electrolyte in solution with changes in moisture content of the gases passing therethrough, and means for determining the conductivity of the liquid drop of electrolyte in solution as an index of the moisture content in the gas.

3. Apparatus for determining moisture in gases which comprises a housing having a gas inlet and a gas outlet, two narrowly spaced electrodes contained in said housing, a liquid drop of an aqueous phosphoric acid solution suspended between the electrodes and having no other support, which liquid drop of phosphoric acid solution is exposed to moisture containing gases passing through the housing thereby varying the moisture content of the liquid drop of phosphoric acid solution with changes in moisture content of the gases passing therethrough, and means for determining the conductivity of the liquid drop of phosphoric acid solution as an index of the moisture content in the gas.

4. Apparatus for determining moisture in gases which comprises a housing having a gas inlet and a gas outlet, a heating jacket surrounding the housing adapted to maintain a constant temperature therein, two electrodes separated by a distance of between about 0.5 and 1.0 mm. contained in said housing, a liquid drop of an aqueous phosphoric acid solution suspended between the electrodes and having no other support, which liquid drop of phosphoric acid solution is exposed to moisture containing gases passing through the housing thereby varying the moisture content of the liquid drop of phosphoric acid solution with changes in moisture content of the gases passing therethrough, and means for determining the conductivity of the liquid drop of phosphoric acid solution as an index of the moisture content in the gas.

CURTIS B. HAYWORTH.

REFERENCES CITED

The following references are of record in the file of this patent:

UNITED STATES PATENTS

| Number | Name | Date |
| --- | --- | --- |
| 1,942,934 | Reeve | Jan. 9, 1934 |
| 2,002,101 | Valby et al. | May 21, 1935 |
| 2,061,424 | Hutton | Nov. 17, 1936 |
| 2,377,426 | Kersten | June 5, 1945 |
| 2,458,348 | Cleveland | Jan. 4, 1949 |
| 2,492,768 | Schaefer | Dec. 27, 1949 |